United States Patent [19]
Ozawa et al.

[11] Patent Number: 5,830,946
[45] Date of Patent: Nov. 3, 1998

[54] RUBBER COMPOSITIONS

[75] Inventors: Ozamu Ozawa; Katsuki Hayashida; Tomoji Saitoh, all of Hiratsuka, Japan

[73] Assignee: The Yokohama Rubber Co., Ltd., Tokyo, Japan

[21] Appl. No.: 720,446

[22] Filed: Oct. 22, 1996

[30] Foreign Application Priority Data

Oct. 23, 1995 [JP] Japan .................................. 7-274170

[51] Int. Cl.$^6$ ............................ C08L 61/04; C08L 61/10; C08L 33/18; C08L 33/20
[52] U.S. Cl. ............................ 525/65; 525/121; 525/308; 138/140; 138/149; 138/153; 138/172; 138/DIG. 1; 428/34.6; 428/34.7; 428/35.7; 428/35.8; 428/35.9; 428/36.8; 428/36.9; 428/36.91
[58] Field of Search ...................................... 525/304, 121, 525/65, 308; 138/153, DIG. 1, 140, 172, 149; 428/34.6, 34.7, 35.7, 35.8, 35.9, 36.8, 36.9, 36.91

[56] References Cited

U.S. PATENT DOCUMENTS

| | | | |
|---|---|---|---|
| 3,658,743 | 4/1972 | Bevilacqua et al. | 260/23.5 A |
| 4,073,776 | 2/1978 | Galkiewicz et al. | 260/51 EP |
| 4,843,114 | 6/1989 | Touchet et al. | 524/87 |
| 4,918,144 | 4/1990 | Fukuda | 525/263 |
| 4,983,678 | 1/1991 | Saito et al. | 525/193 |
| 4,990,570 | 2/1991 | Saito et al. | 525/254 |
| 5,208,294 | 5/1993 | Brown | 525/263 |
| 5,234,387 | 8/1993 | Fujiwara et al. | 474/205 |
| 5,312,869 | 5/1994 | Nomura et al. | 525/193 |
| 5,314,955 | 5/1994 | Halladay | 525/139 |
| 5,370,915 | 12/1994 | Hirakawa | 428/36.8 |
| 5,376,448 | 12/1994 | Suzuki et al. | 428/382 |
| 5,405,690 | 4/1995 | Hirakawa | 428/327 |
| 5,506,308 | 4/1996 | Ahmad et al. | 525/256 |
| 5,599,246 | 2/1997 | Fujiwara et al. | 474/205 |

*Primary Examiner*—Frederick Krass
*Attorney, Agent, or Firm*—Finnegan, Henderson, Farabow, Garrett & Dunner

[57] ABSTRACT

A rubber composition comprises a hydrogenated NBR, zinc dimethacrylate, zinc diacrylate, or an admixture thereof, an epoxy compound and an organic peroxide vulcanizer. A hose is also provided, comprising an inner tube, a reinforcement layer and an outer tube, at least the inner tube being formed from the above rubber composition.

2 Claims, 1 Drawing Sheet

RUBBER COMPOSITIONS

BACKGROUND OF THE INVENTION

1. Field of the Invention

This invention relates to rubber compositions containing a hydrogenated acrylonitrile butadiene rubber (NBR) and hoses incorporating vulcanizates of the same for their inner tubes.

2. Prior Art

A vulcanized hydrogenated NBR per se is highly resistant to oil and heat. It is known that a vulcanizate of rubber composition such as that commercially available as ZSC from Nippon Zeon Company, Japan, including a vulcanizing system comprised of zinc dimethacrylate and/or zinc diacrylate and an organic peroxide excels in mechanical strength and resistance to heat and oil.

However, such rubber composition is not satisfactory in adhesiveness to metals such as brass and is thus limited in its application to rubber products such as tires, belts, rolls, shapes, hoses and the like which incorporate reinforcement layers formed from steel wires plated with zinc or brass.

SUMMARY OF THE INVENTION

With the foregoing drawbacks of the prior art in view, the present invention seeks to provide a rubber composition which is capable of firmly bonding to metals while retaining good oil and heat resistance properties intrinsic of hydrogenated NBR vulcanizates.

The invention also seeks to provide a hose comprised of a reinforcement layer having at least a surface formed from brass or zinc and an inner tube formed from a vulcanizate of the aforesaid rubber composition.

It has now been found that a rubber composition comprising a hydrogenated NBR, zinc dimethacrylate or zinc diacrylate or an admixture thereof, an epoxy compound and an organic peroxide vulcanizing agent can exhibit high mechanical strength and good adhesion or bonding with respect to metals.

According to one aspect of the invention, there is provided a rubber composition which comprises a hydrogenated NBR, zinc dimethacrylate and/or zinc diacrylate, an epoxy compound and an organic peroxide vulcanizing agent.

According to another aspect of the invention, there is provided a hose comprised of an inner tube, a reinforcement layer formed from a steel cord plated with brass or zinc and an outer or cover tube, at least the inner tube being formed from a vulcanizate of the rubber composition of the invention.

DETAILED DESCRIPTION OF THE INVENTION

Figure 1:
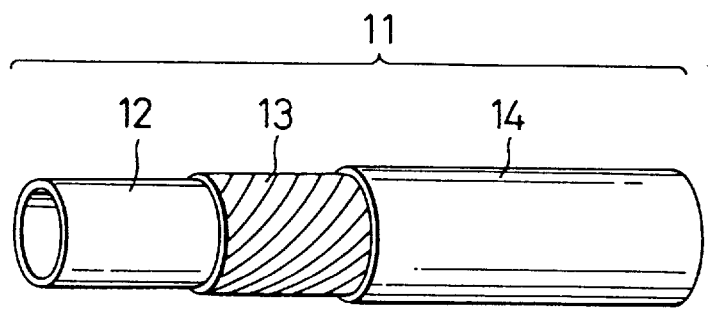
FIG. 1 is a diagramatic view of a hose embodying the invention.

According to a first preferred embodiment of the invention, there is provided a rubber composition which comprises a hydrogenated NBR, zinc dimethacrylate and/or zinc diacrylate, an epoxy compound and an organic peroxide vulcanizing agent.

With the properties of mechanical strength and rubber elasticity of the resulting rubber product taken into account, there should be used zinc dimethacrylate or zinc diacrylate or an admixture thereof in a total amount of 30–200, preferably 50–150 parts by weight per 100 parts by weight of hydrogenated NBR. This type of compound is commercially available as seen for example in R-20A or CPR manufactured by Asada Chemicals Company Ltd., Japan.

The epoxy compound contained in the inventive composition is preferably an epoxy resin which has two or more epoxy groups per molecule and an epoxy equivalent of more than 100, preferably in the range of 120 to 300. Epoxy equivalents within this range can lead to concerted reaction of hydrogenated NBR, zinc dimethacrylate or zinc diacrylate with the epoxy resin and the organic peroxide and can also afford the epoxy resin with a maximum bonding ability with respect to reinforcing plated steel wires.

Preferred examples of the glycidyl ether epoxy resin are glycidyl ethers of dihydric phenol, of which polyglycidyl ethers of bisphenol A and bisphenol F are particularly preferred. Alternatively, there may be used Sumi Epoxy ELA 115 manufactured by Sumitomo Chemical Industry Company Ltd., Japan.

The use of the epoxy compound in the invention contributes, owing to its presence in the cross-linking reaction between the hydrogenated NBR, zinc dimethacrylate or zinc diacrylate and the organic peroxide, to good oil and heat resistance properties on account of the polarity of the epoxy groups which enhances bonding to the brass- or zinc-plated wire.

The term hydrogenated NBR as used herein denotes a rubber derived by hydrogenating the double-bonded carbon atoms in a random copolymer of butadiene and acrylonitrile having an acrylonitrile unit content of 15 to 50, preferably 25 to 45 percent by weight. The rate of this hydrogenation should be more than 80 percent, preferably more than 95 percent. The Mooney viscosity ($M_{L1+4}$ at 100° C.) of the hydrogenated NBR should be in the range of 40 to 100. Such hydrogenated NBR is commercially available for example Zetpol 2000 manufactured by Nippon Zeon Company Ltd., Japan.

There may be used in the inventive composition any organic peroxide vulcanizers which do not excessively accelerate the progress of cross-linking reaction at a given processing temperature. Preferred is a dialkylperoxide having a decomposition rate of 10 hours half-life at temperatures above 80° C. and typically including dicumyl peroxide, 1,3-bis-(t-butyl-peroxy-isopropyl)benzene and 4,4-di-t-butylperoxy valeric acid n-butyl. These organic peroxides are commercially available for instance as Perkadox 14/40 of Kayaku Akzo Company Ltd., Japan.

The organic peroxide vulcanizing agent may be added in the range of 0.1–20, preferably 1–10 parts by weight per 100 parts by weight of the hydrogenated NBR. This range is conducive to adequate progress of the cross-linking reaction and also to excellent physical properties including high adhesiveness of the inventive rubber composition.

The rubber composition according to the invention may be further blended with various additives in an amount such that they do not hinder the properties of the rubber composition. Examples of such additives include plasticizers, reinforcing agents, antideteriorants, coloring agents, vulcanizing assistants, vulcanizing accelerators and the like. Eligible vulcanizing assistants and vulcanizing accelerators include cyanuric acid such as triarylisocyanurate, triarylcyanurate and the like, acrylic acid such as trimethylolpropanemethaacrylate and a small amount of sulfur donor.

The preparation of the inventive rubber composition may be carried out in a conventional manner such as by kneading at a temperature of 100°–200° C. on Bunbury mixer, followed by addition of the vulcanizing agent during rolling or with use of the Bunbury mixer. The resultant unvulcanized rubber composition may be molded to a predetermined shape and at the same time or later vulcanized by heating at a temperature of 130°–200° C. for a period of 10 to 90 minutes, thereby obtaining a vulcanized rubber composition. The resulting vulcanizate excels in breaking strength, heat resistance and oil resistance and is capable of firmly bonding to a metal such as brass, zinc and the like to form a rubber/metal bonded composite.

The metals that may be bonded to the inventive rubber composition or vulcanizates thereof are utilized to reinforce various rubber products and may be in the form of filaments, tubings, plates and the like.

According to the second aspect of the invention, there is provided a rubber product comprised of a vulcanizate of the inventive rubber composition.

In view of typical applications at elevated pressure or temperature, the rubber products should have high breaking strength and increased resistance to heat and oil and at the same time should be strongly bondable to reinforcement metals so as to ensure durability against deformatory stresses while in use.

The rubber composition according to the invention finds extensive application to belts, rolls, molded articles, hoses and various other rubber products.

Referring now to the drawings, there is shown, for purposes of illustration a hose 11 fabricated from a vulcanizate of the inventive rubber composition.

The hose 11 is constructed with an inner tube 12, a reinforcement layer 13 and an outer tube 14, the inner tube being formed from a vulcanizate of the inventive composition.

The rubber hose according to the invention may have a diameter of the conventional counterparts in the range of 5 mm to 50 mm.

The inner tube 12 is disposed for direct contact with a fluid such as liquid running through the hose 10 and intimately bonded to the reinforcement layer 13. It has a thickness preferably in the range of 0.3 mm to 5 mm.

The reinforcement layer 13 bonded in place between the inner tube 12 and the outer tube 14 may be of a single layer of a mesh of brass or brass plating, or a metal wire of steel plated with brass or zinc, or of a multi-layer structure of alternate reinforcement layers and vulcanizate layers of the inventive rubber composition. Any metals are eligible for use in the invention as long as they do not adversely affect the physical properties of the hose.

The outer tube 14 is bonded to the reinforcement layer 13 and serves to protect this layer as well as the inner tube 12 against damage from external stresses and heat.

The outer tube 4 may be formed from the inventive rubber composition or vulcanizates of any other rubber compositions such as chloroprene rubber (CR), butyl rubber (IIR, Cl-IIR, Br-IIR), styrene butadiene rubber (SBR), ethylene-propylene copolymer rubber (EPM, EPDM), chlorinated polyethylene rubber (CM), chlorosulfonated polyethylene rubber (CSM), hydrin rubber (CHC, CHR), isobutylene-brominated paramethylstyrene copolymer rubber and the like.

The hose 10 may be manufactured by any known suitable methods. As for an example, the inner tube 12 is wrapped around a mandrel, followed by disposing the reinforcement layer 13 thereover and wrapping thereon the outer tube 14 which may be, if desired, covered with a sheath of lead, the whole being then vulcanized.

The invention will now be described by way of the following examples which are provided for purposes of illustration but not in the limiting sense.

INVENTIVE EXAMPLES 1–8 AND COMPARATIVE EXAMPLES 1–3

The components constituting the rubber compositions shown in Table 1 except for the organic peroxide were kneaded on Bunbury mixer for a time length of 5 minutes, followed by kneading the organic peroxide on a milling roll and sheeting the resulting compositions to a thickness of 2.5 mm. Each of the resulting sheets was cut to a size of 15 cm×15 cm and superimposed on a brass plate measuring 15 cm×15 cm×2 mm, followed by press-curing at 160° C. for 30 minutes in a mold thereby to produce a rubber-metal bonded composite structure for use in testing its strength of bond to brass with the results shown in Table 1. Separately, each of the sheeted compositions was vulcanized in a mold of 15 cm×15 cm×2 mm at 160° C. for 30 minutes for use in testing its physical properties with the results shown in Table 1.

Each of the rubbers comprised of the rubber compositions shown in Table 1 was extruded onto a mandrel by means of an extruder equipped with a cross head to form an inner tube. A brass-plated wire was braided over the inner tube, followed by extrusion of chloroprene rubber (CR) thereover to form an outer tube. The resulting structure was wrapped with a cloth and then steam-cured in a vulcanizing pan at 160° C. for 60 minutes. With the cloth removed, the resulting vulcanized structure was released from the mandrel, thereby providing a hose consisting of an inner tube having an inner diameter of 10 mm, an outer diameter of 13 mm and a radial thickness of 1.5 mm, a reinforcement layer of brass-plated wire and an outer tube having an outer diameter of 19 mm. The resulting hoses were tested for adhesive strength and impulse durability with the results shown in Table 1.

Listed below are the test methods used for evaluating the physical properties of each of the rubber compositions shown in Table 1.

(1) Peel strength

The procedure of JIS K6301 was followed.

(2) Rubber Deposits Peeled portions

The extent to which rubber was deposited on the brass plate was measured in percentage by examining the portions of the rubber sheets that had been peeled during the above peel test.

(3) Tensile strength

The procedure of JIS 6301-3 was followed.

(4) Elongation

The procedure of JIS 6301-3 was followed.

(5) Modulus

The procedure of JIS K6301-3 was followed in measuring 100% module.

(6) JIS hardness

The procedure of JIS K6301-5 was followed.

(7) Hose performance evaluation

This test was conducted at 160° C. in accordance with the procedure of SAE11B8 TYPE1 to determine the impulse durability. The hose was regarded acceptable if it withstood more than one million cycles of impulse test.

The marking "X" in Table 1 indicates that no impulse was made.

TABLE 1

|  | Comparative Examples | | | | | Inventive Examples | | | | | | | |
| --- | --- | --- | --- | --- | --- | --- | --- | --- | --- | --- | --- | --- | --- |
|  | 1 | 2 | 3 | 4 | 5 | 1 | 2 | 3 | 4 | 5 | 6 | 7 | 8 |
| hydrogenerated NBR *1 | 100 | 100 | 100 | 100 | 100 | 100 | 100 | 100 | 100 | 100 | 100 | 100 | 100 |
| zinc dimethacylate *2 | 35 | 50 |  | 200 | 250 | 35 | 50 |  | 200 | 50 | 200 | 250 | 200 |
| zinc diacrylate *3 |  |  | 50 |  |  |  |  | 50 |  |  |  |  |  |
| diglycidyl ether of *4 bisphenol A | — | — | — | — | — | 5 | 5 | 5 | 5 | 30 | 30 | 5 | 40 |
| organic peroxide *5 vulcanizer | 8 | 8 | 8 | 8 | 8 | 8 | 8 | 8 | 8 | 8 | 8 | 8 | 8 |
| tensile strength $T_B$ (kg/cm$^2$) | 370 | 420 | 400 | 530 | 420 | 350 | 400 | 380 | 510 | 360 | 410 | 240 | 240 |
| breaking elongation $E_B$ (%) | 260 | 350 | 330 | 430 | 430 | 250 | 340 | 320 | 420 | 210 | 290 | 120 | 120 |
| modulus $M_{100}$ (kg/mm) | 55 | 40 | 35 | 30 | 17 | 70 | 55 | 50 | 45 | 92 | 81 | 24 | 135 |
| JIS hardness Hs | 75 | 70 | 70 | 65 | 62 | 80 | 75 | 75 | 70 | 89 | 82 | 64 | 95 |
| adhesion to brass |  |  |  |  |  |  |  |  |  |  |  |  |  |
| peel strength (kgf/25 cm 2) | 0 | 0 | 0 | 0 | 0 | 15 | 18 | 18 | 21 | 21 | 20 | 12 | 20 |
| adhesiveness (%) | 0 | 0 | 0 | 0 | 0 | 90 | 100 | 100 | 100 | 95 | 95 | 50 | 70 |
| hose performance evaluation (impulse resistance test at elevated temperature) |  |  |  |  |  |  |  |  |  |  |  |  |  |
| impulse durability (10 thousands times) | X | <0.1 | <0.1 | X | X | >100 | >100 | >100 | >100 | >100 | >100 | 11 | 15 |

*1 . . . Zetpol 2000, Nippon Zeon Co.
*2 . . . R-20S, Asada Chemicals Co.
*3 . . . CPR, Asada Chemicals Co.
*4 . . . Sumiepoxy, Sumitomo Chemicals Co.
*5 . . . Perkadox 14/40, Kayaku Akzo Co.

What is claimed is:

1. A rubber composition which comprises: 100 parts by weight of a hydrogenated NBR; 30 to 200 parts by weight of zinc dimethacrylate, zinc diacrylate, or an admixture thereof; 5 to 30 parts by weight of an epoxy compound; and 0.1 to 10 parts by weight of an organic peroxide vulcanizer; wherein said epoxy compound is an epoxy resin which has two or more epoxy groups per molecule and an epoxy equivalent of more than 100.

2. A hose comprised of an inner tube, a reinforcement layer formed from a steel wire plated with brass and an outer tube, at least said inner tube being formed from a vulcanizate of the rubber composition of claim 1.

* * * * *